United States Patent [19]
Straub et al.

[11] Patent Number: 6,035,284
[45] Date of Patent: Mar. 7, 2000

[54] SYSTEM AND METHOD FOR PRODUCT RATIONALIZATION

[75] Inventors: David J. Straub, Grover, Mo.; Andrew C. Schlueter, Edwardsville; Donna K. Velsor, Alton, both of Ill.

[73] Assignee: Ralston Purina Company, St. Louis, Mo.

[21] Appl. No.: 08/572,209

[22] Filed: Dec. 13, 1995

[51] Int. Cl.⁷ .................................................. G06F 17/60
[52] U.S. Cl. ......................... 705/28; 235/385; 364/400; 705/1; 707/104; 707/200
[58] Field of Search ................................. 235/375, 383, 235/385; 364/400; 705/1, 7, 10, 22, 28; 707/104, 200, 206

[56] References Cited

U.S. PATENT DOCUMENTS

| | | | |
|---|---|---|---|
| 3,426,326 | 2/1969 | Goldstein | 235/385 X |
| 5,537,313 | 7/1996 | Pirelli | 705/28 |
| 5,611,051 | 3/1997 | Pirelli | 705/10 |
| 5,712,989 | 1/1998 | Johnson et al. | 705/28 |
| 5,774,868 | 6/1998 | Cragun et al. | 705/10 |
| 5,878,401 | 3/1999 | Joseph | 705/22 |

*Primary Examiner*—Edward R. Cosimano
*Attorney, Agent, or Firm*—Armstrong Teasdale LLP

[57] ABSTRACT

A product rationalization system and method for automatically and objectively determining products sold by an account that are candidates for deletion from the account's inventory includes a memory and a processor communicatively coupled to the memory. The processor has means for associating account data and the product attribute data, where the account data includes an account sort measure for each product of a plurality of account products. Each product identifier of the product attribute data identifies its respective product with a product group consisting of a cluster of products that are considered substitutes for each other. Upon sorting the associated data for the products by product identifier and by account sort measure, a product of each group of products that are considered substitutes is determined to be a candidate for deletion from the account's inventory.

26 Claims, 13 Drawing Sheets

6,035,284

SYSTEM AND METHOD FOR PRODUCT RATIONALIZATION

BACKGROUND OF THE INVENTION

The present invention relates generally to a product rationalization system and method and more particularly to a system and method for making product deletion and addition recommendations for an account's inventory.

Account managers face an ever-growing number of products to offer to their customers, but have a fixed amount of store space in which to display their products. This dilemma forces account managers to make decisions, which are often subjective, as to the best mix of products to offer their customers. These decisions have become more important than ever since recent trends show a marked increase in the number of items stocked by stores and in the number of new product lines available to be stocked, while sales per square foot of store have decreased.

Thus, the goal of most account managers is to offer an optimum mix of products that maximizes sales without requiring additional store space. One way of obtaining such an optimized mix of products is to eliminate products that are perceived as duplicates by consumers from an account's inventory while adding products that increase the account's sales volume. However, there exists no satisfactory tool that enables account managers to objectively determine which products are candidates for deletion from an account's inventory and which products are candidates for addition to the account's inventory based on all the relevant and available market information.

It is therefore an object of the present invention to provide a product rationalization system and method for automatically and objectively determining products sold by an account that are candidates for deletion from the account's inventory.

It is a further object of the present invention to provide a product rationalization system and method for automatically and objectively determining products that are candidates for addition to an account's inventory.

It is yet a further object of the present invention to provide a product rationalization system and method for automatically and objectively determining products stocked by an account and products that are not stocked by an account that are candidates for swapping in the account's inventory.

SUMMARY OF THE INVENTION

This invention is a product rationalization system and method for automatically and objectively determining products sold by an account that are candidates for deletion from the account's inventory. The product rationalization system comprises a memory and a processor communicatively coupled to the memory. Product attribute data for a plurality of products is stored on the memory, where the product attribute data includes a product identifier for each product. The product identifier identifies a product group to which its respective product belongs.

The processor has means for associating account data and the product attribute data, where the account data includes an account sort measure for each product of a plurality of account products. The processor further has means for automatically sorting the associated data for the plurality of account products by product identifier and by account sort measure to determine whether each product of the plurality of account products is a candidate for deletion from its product group, and, therefore, a candidate for deletion from the account's inventory.

In one embodiment of the present invention, each product identifier of the product attribute data identifies its respective product with a product group consisting of a cluster of products that are considered substitutes for each other. Upon sorting the associated data for the products by product identifier and by account sort measure, a product of each group of products that are considered substitutes is determined to be a candidate for deletion from the account's inventory.

In another embodiment of the invention, each product identifier of the product attribute data includes a set of product characteristics of its respective product that are hierarchically ranked according to characteristic significance, where each product identifier identifies its respective product with a product group having a common set of characteristics except for a least significant characteristic. Upon sorting the associated data for the products by product identifier and by sort measure, a product of each group of products having a common set of characteristics except for a least significant characteristic is determined to be a candidate for deletion from the account's inventory.

In another aspect, the present invention is a product rationalization system and method for automatically and objectively determining products that are candidates for addition to an account's inventory. The product rationalization system comprises a memory and a processor communicatively coupled to the memory. Market data for a plurality of products is stored on the memory, where the market data includes a list of substantially all products available in a market.

The processor has means for associating the market data with account data. The account data includes an account distribution measure for each product of a plurality of account products. Products included in the market data that are not included in the account data have a zero-value account distribution measure. The processor further has means for automatically sorting the associated data to determine products having an account distribution measure equal to or below a minimum account distribution measure to determine products that are candidates for addition to the account's inventory.

In one embodiment, the candidates for addition are ranked according to prospective success in the account. The market data includes a market sort measure and a market distribution measure, and the account data includes an account market share measure. The processor includes means for determining a ranking value for each product of the plurality of products from the market sort measure, the market distribution measure, and the account market share measure of the associated market and account data. The ranking value may be used to determine the prospective success of each product in the account.

In a further embodiment, candidates for swapping are determined from the products determined to be candidates for addition and from products in the account's inventory. A second memory is provided having a product attribute database stored thereon. The product attribute database includes a product identifier for each of the plurality of products, where each product identifier identifies a product group to which its respective product belongs.

The processor is communicatively coupled with the second memory. The processor has means for associating the product attribute data with the account data to correlate each product included in the account data with a product identifier. The processor also has means for associating the product attribute data with the associated market and account data to correlate a product identifier with each product determined to be a candidate for addition to the account's inventory. The processor further has means for automatically pairing products having matching product identifiers from the products that are candidates for addition and the products in the account to identify products that are candidates for swapping in the account's inventory.

The present invention provides a tool for optimizing an account's product mix to maximize account sales without requiring additional store space. Market and account information may be automatically analyzed to provide objectively assessed deletion, addition, and swapping recommendations for the account's inventory, eliminating subjective guesswork while providing a comprehensive analysis of available product information.

DESCRIPTION OF THE PREFERRED EMBODIMENTS

Figure 1:
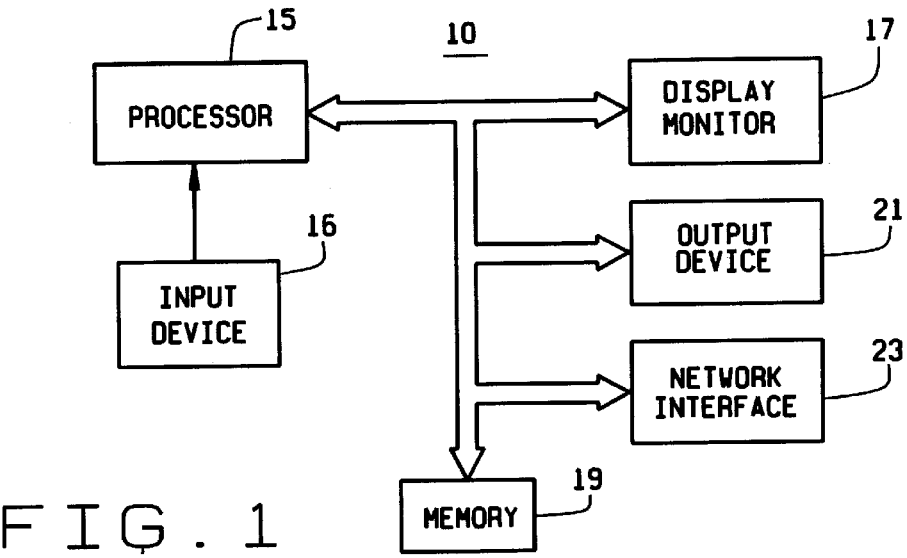
FIG. 1 is a block diagram illustrating a hardware implementation of the present invention.

FIG. 1 shows a schematic diagram of a data processing system 10 in which the product rationalization system of the present invention may be implemented. Data processing system 10 may be any suitable general purpose or dedicated data processing system, and includes a processor 15, and a memory storage device 19, such as a hard drive. One or more memory storage devices 19 may be utilized as needed, in accordance with the present invention.

The processor 15 includes a user interface, which may have a display monitor 17 and an input device 16, such as a keyboard or a mouse. The processor 15 is communicatively coupled to the memory storage device(s) 19 so that the processor may retrieve data stored on the memory storage device(s) 19 for processing. Preferably, the processor 15 is also communicatively coupled to an output device 21, such as a printer, so product recommendations processed according to the present invention may be output in a report form. The processor may also be coupled to a network interface 23 so the processor may transmit and retrieve data to and from a remote database.

In general, the product rationalization system of the present invention is implemented on the data processing system 10 to provide recommendations for deletion of products from an account's inventory, recommendations for product additions to the account's inventory, and recommendations to swap products stocked by an account for products not stocked by the account. As used herein, an account is a store, a chain of stores, or any other retail or wholesale outlet or chain of outlets having an inventory of products which are susceptible to product rationalization. As further used herein, a market is a defined segment of trade which includes the products in an account's inventory, and typically includes products not in the account's inventory. For example, an account may be a particular chain of grocery stores in a specific geographical region, where the market is defined as all grocery stores in that region.

To perform recommendations for an account's inventory, initially a product attribute database is developed and stored in the memory 19. Preferably, the product attribute database is prepared before actually processing deletion, addition or swapping recommendations so data from the product attribute database is readily available at the time recommendations are to be generated.

The product attribute database provides a complete listing of products, product descriptions, and any other relevant information for a majority, and preferably all, of the products in the market of interest. In a preferred embodiment, each product included in the product attribute database is listed by its universal product code (UPC) and is described by a product description.

The product attribute database also includes a product identifier for each product listed in the product attribute database. The product identifier classifies its respective product according to customer perceived substitutability with other products listed in the product attribute database and/or according to characteristics of the product. In a recommendation process, the processor may sort the data from the product attribute database by the product identifier of each respective product to identify products that are perceived by customers as substitutes for each other and/or products having similar characteristics.

In a preferred embodiment of the invention, the product identifiers of the products in the product attribute database identify products that are perceived as substitutes. To indicate products that are perceived as substitutes, the product identifier identifies a product as being associated with a cluster of products that are customer perceived duplicates. All products in the product attribute database that are perceived as substitutes for each other are assigned a common product identifier. Preferably, the product attribute database contains a plurality of products which may be identified with one of a plurality of clusters of substitutable products.

In a preferred embodiment, the substitutability of the products is determined by conducting a customer survey and analyzing the survey results to determine which products customers perceive as substitutes for one another. For example, to develop clusters of products considered to be substitutes for a product attribute database of pet food products a survey may be taken in which customers are asked which grocery store in their market they shop at most often, and which forms of dog and cat food (dry/canned/moist/treats) they have purchased in the past six months. For each form, customers are asked for the specific brand, size, and flavor of product they bought. Then the customers are asked which product they would buy if that specific item were no longer available to determine which products are customer perceived substitutes.

Using the results of a such a survey, an analysis may be performed on the combined customer responses to determine which products customers, as a group, perceive as duplicates. The analysis may utilize any statistical technique that is designed to group products together based upon their similarity to each other. In a preferred statistical technique, all the possible combinations of products to which a customer could switch are considered. The basis on which products are placed, or not placed, in the same cluster group may be a calculated score that estimates the "distance" between a pair of products in the analysis. The more often customers indicated that two products could be substituted for one another, the closer the "distance" between the products, and the more likely they would be placed in the same cluster group.

After the analysis is performed, product identifiers are assigned to each product included in the product attribute database based on the results of the analysis to identify each product with a substitutable cluster of products. If a product is considered to be unique with no customer perceived duplicate, the product is assigned a unique product identifier.

Preferably the product identifier is a number. Although no particular numbering scheme is required, for sorting purposes a preferred numbering scheme assigns the lowest possible product identifier number to the cluster of products having the greatest indication of substitutability within the cluster of products, and the highest product identifier numbers are assigned to clusters of products having a lowest indication of substitutability, such as a cluster consisting of a single product.

Although a particular surveying method and cluster analysis are described above, any surveying and analysis techniques could be used to determine whether customers would substitute any two or more products for one another, and to determine whether products should be clustered together and assigned a common product identifier in the product attribute database.

Figure 2:
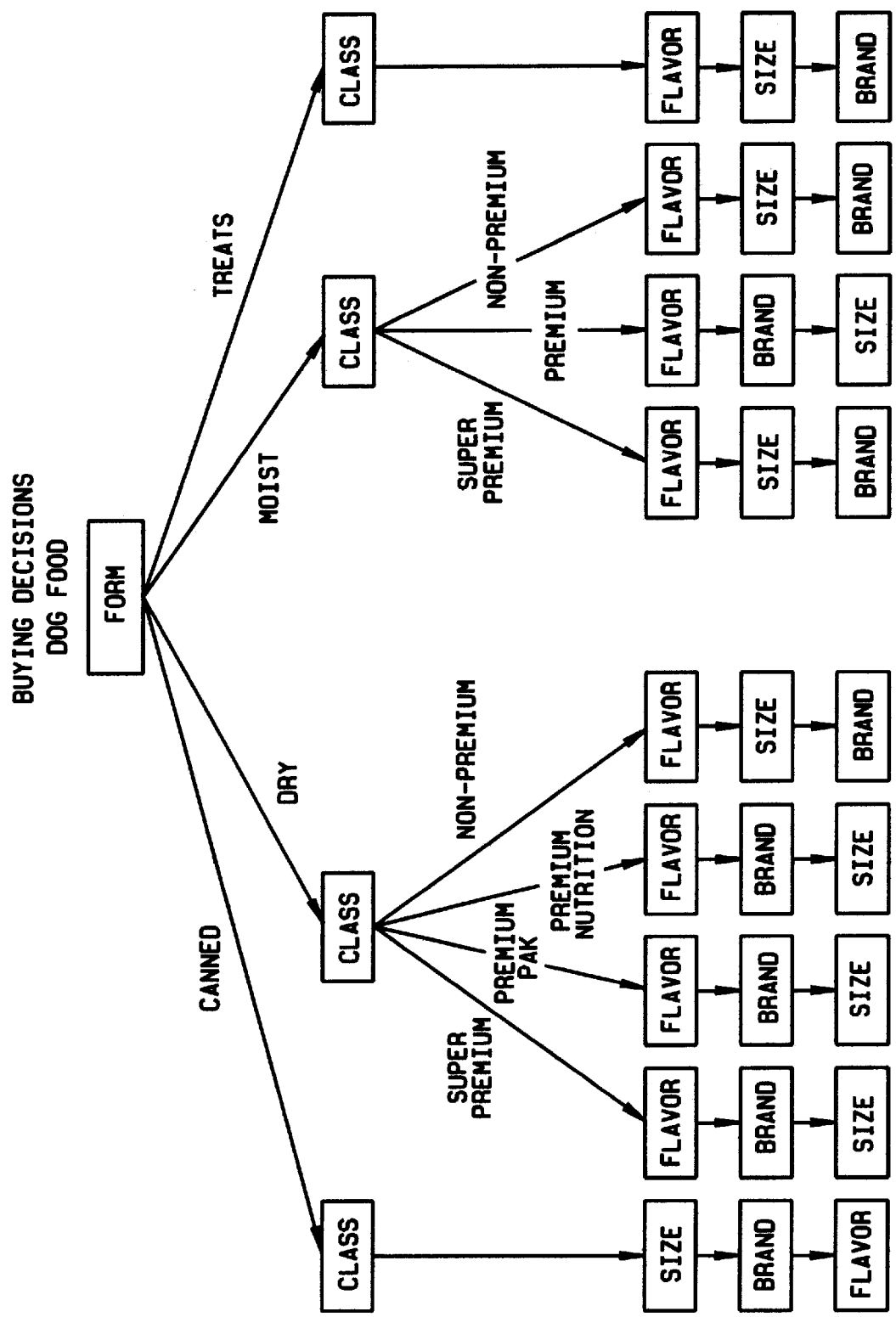
FIG. 2 is a block diagram illustrating a product characteristic hierarchy for the dog food category.
Figure 3:
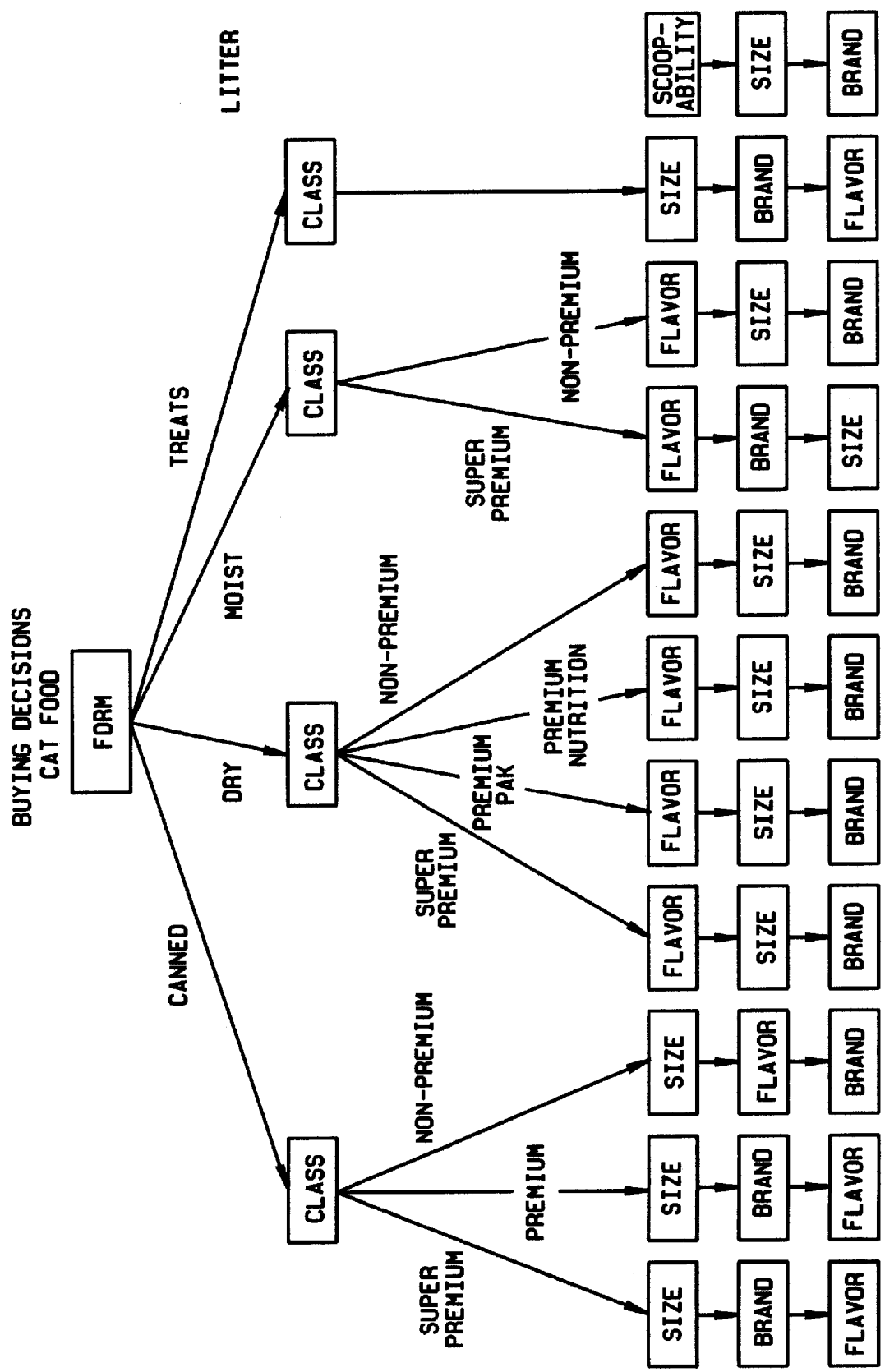
FIG. 3 is a block diagram illustrating a product characteristic hierarchy for the cat food category.

In another preferred embodiment of the invention, the product identifier is a set of product characteristics which may be used to identify similar products included in the product attribute database. As shown in FIGS. 2 and 3, characteristics that may be included in the product identifier are the product category (i.e. dog food, cat food), the product form (moist, dry etc.), the product class (super premium, non-premium etc.), product brand, product size, and product flavor. The characteristics that may be included in the product identifier are not limited to the above listed characteristics, and may be selected based on the products, and the degree of similarity desired between products for recommendation processing.

The set of characteristics included in the product identifier are hierarchically ranked according to the significance of each characteristic. In a preferred embodiment, the significance of each characteristic is determined according to consumer buying decision patterns. FIGS. 2 and 3 illustrate model dog food and cat food characteristic hierarchies based on consumer buying decision patterns. Such characteristic hierarchies represent basic buying trends or patterns, and show the decision path a consumer is likely to follow in buying specific forms of products. For example, as shown in FIG. 2, a consumer may buy a dry dog food product according to the following characteristics: super premium, flavor, brand, and size, where the characteristics decrease in significance in the consumer's buying decision in the order they are listed.

In a preferred embodiment, the product characteristics are hierarchically ranked based upon consumer research. Customers may be asked whether they have purchased a particular type of product recently, and then may be asked about the specific characteristics of the product they bought. For example, a customer may be asked if they have purchased pet food recently, and if so, the category, form, brand, size, and flavor of the product they purchased. The customers are then asked which product characteristics would be most important, less important, and least important in selecting a different product if the product they normally purchased were no longer available. For example, in selecting a pet food, customers may be asked whether they would: buy a different size of the same brand and the same flavor of the discontinued pet food; buy the same size of the same brand of the pet food in a different flavor; or buy a different brand of the same size and same flavor.

The hierarchically ordered product characteristics included in the product identifier may be used to determine whether products are similar for recommendation purposes. Products are determined to be similar if the product characteristics included in the product identifier are substantially the same, except for the lower ranking, less important product characteristics. In a preferred embodiment, products are considered to have similar characteristics if the characteristics of the products are the same except for the least significant characteristic in a consumer buying decision pattern.

In a most preferred embodiment of the invention, the product attribute database includes product identifiers for each product in the database which identify products that are perceived as substitutes and products that have similar characteristics. Product identifiers for identifying products that are perceived as substitutes and product identifiers for identifying products with similar characteristics are developed for each product as described above.

Once the product attribute database is developed and stored in the memory 19, the processor 15 may generate product deletion, addition, and/or swapping recommendations. To generate deletion recommendations, the processor 15 accesses the memory to retrieve data from the product attribute database. The processor 15 associates the retrieved product attribute data with account data input into the processor to associate a product identifier from the product attribute database with a corresponding product included in the account data. Preferably the products included in the account data are listed by UPC code and by product description, and are associated with products in the product attribute data by matching identical UPC codes.

The account data provides information relating to the performance of most, and preferably all, of the products in the account's inventory. The account data includes an account sort measure for each product in the account. The account sort measure may be any measure of product performance, and, in a preferred embodiment, is the account level sales or profit volume of the product with which the account sort measure is associated.

Preferably, the account data is input into the processor from an account file or from a service provider such as Information Resources, Inc. (IRI) in Chicago, Ill. which provides information regarding product performance. If the account data is from the account, the processor reads the data in from an account level data file provided by the account. If the account data is from a service provider, the data is read in from an account level data file from the service provider, where the account level data file from the service provider is organized to provide data for products in the account's inventory.

The processor automatically sorts the associated product attribute data and account data for each of the account products by product identifier and by account sort measure to determine products that are candidates for deletion from the account's inventory. The processor sorts the associated data by product identifier to identify each product with a group of products. The associated data may be sorted by the product identifier to identify the products with clusters of products that are customer perceived substitutes and/or the associated data may be sorted by the hierarchically ranked product characteristics of the product identifier to identify the products with groups of products having similar characteristics.

The associated data is also sorted by the account sort measure to identify each product in the sorted groups of products having an undesirable account sort measure relative to its respective group of products. In a preferred embodiment, the associated data is sorted by the account sort measure to identify each product in the sorted groups having the least desirable account sort measure of its respective product group.

Each product having an undesirable account sort measure in its respective group of products is candidate for deletion from the account's inventory. For example, each product of each group of products that are perceived as duplicates which has the lowest sales volume of its group, or each product of each group of products with similar characteristics which has the lowest sales volume of its group, may be determined to be candidates for deletion from account's inventory.

In a preferred embodiment, the processor also provides deletion recommendations based solely on the account sort measure of the account products. The processor sorts the products in the account data by their respective account sort measures, without grouping the account products according to their product identifiers. All products having an account sort measure equal to and below a specified minimum account sort measure are recommended for deletion in a report. For example, all account products having a dollar sales volume equal to and below a specified minimum sales volume would be recommended for deletion from the account's inventory if the account sort measure was defined as the dollar sales volume of a product.

In a preferred embodiment, the processor generates a report list of the deletion recommendations which is output to the output device 21. Most preferably, the processor generates a report list of the deletion recommendations which is output to a printer for printing.

In one embodiment of the invention, the processor screens certain account products from being considered as candidates for deletion from the account's inventory. New and recently discontinued products, as well as products which the account desires to retain for a particular account marketing strategy may be screened from the deletion recommendation process. Examples of such strategies include: a "Defensive Strategy" in which all large sizes are protected at any cost, a "Super Premium Strategy" in which all super premium items are protected, a "Small Size Strategy" in which all small sizes are protected, and a "Minimize Risk Strategy" in which all products with a significant volume are protected. In a preferred embodiment, a list of the screened products is generated and is output to an output device such as a printer in a report form.

To screen new and recently discontinued products from the deletion recommendation process, the processor receives input from an input device, such as a keyboard, or from the account data specifying a minimum account sort measure and/or a minimum distribution level for the products to be considered as candidates for deletion. The account data provides an account distribution measure for each product in the account, where the account distribution measure specifies the account distribution level of its respective product. The processor removes all account products having an account distribution measure equal to or below the minimum distribution level and/or all account products having an account sort measure equal to or below the minimum account sort measure from the deletion recommendation process.

To implement a particular marketing strategy, the processor receives input from an input device or the account file specifying selected products which are to be removed from the deletion recommendation process. In the marketing strategy input, individual product UPCs or groupings of product UPCs identify the products which are to be removed from the deletion recommendation process. The processor screens the selected products from the deletion recommendation process.

To generate recommendations for additions to an account's inventory, initially the processor accesses a memory 19 containing a market product database and retrieves market data from the database. The market product database provides data relating to the performance of a majority, and preferably all, of the products in the market of interest. The market data includes a listing of products in the market, preferably listed by each product's UPC code, and a product description of each product.

Preferably, the market data is stored in an account file on an account memory device, or is stored in a service provider's file on a service provider's memory device, where a service provider, such as IRI, provides information regarding products in the relevant market. If the market performance data is provided by the account, the processor retrieves the data from a market level data file in a memory device provided by the account. If the market performance data is provided by a service provider, the data is retrieved from a market level data file in the service provider's memory.

The processor associates the retrieved market data with the account data. As noted above, the account data includes an account distribution measure for each of the products in the account. The account distribution measure indicates the extent of distribution of its respective account product in the account. The account distribution measure may be any measure of product distribution in the marketplace, including product sales volume, and, preferably, the percent of all commodity volume (% ACV).

The processor associates the market and account data to correlate data for each product in the account with data for the same product in the market. Preferably products in the account and market data are associated by matching identical UPC codes. Products included in the market data which have no corresponding account product are identified as having no account distribution, and have an account distribution measure indicating a zero-level of account distribution.

The processor then automatically sorts the associated data by the account distribution measure of each product therein to determine which products have an account distribution measure below a selected minimum account distribution measure. The minimum account distribution measure indicates a distribution level at which, and below which, a product is considered not to be distributed by the account, where the minimum account distribution measure may be selected to have a value equal to or greater than a zero-level of account distribution. The processor determines the selected minimum account distribution measure from input received from an input device such as a keyboard, or from the account data. Products which are considered not to be distributed by the account are candidates for addition to the account's inventory.

In a preferred embodiment, products having minimal distribution in the market are screened from being considered as candidates for addition to the account's inventory. The market data may include a market distribution measure for each product in the market. The market distribution measure specifies the distribution of its respective product in the market, and may be any measure of product distribution, and preferably is a percent of all commodity volume (% ACV). The processor may set a minimum market distribution measure according to user input, where the minimum market distribution measure indicates a level of distribution in the market below which a product is not considered to be sufficiently distributed to accurately predict whether the product should be recommended as an addition candidate. The processor sorts the associated account and market data by the market distribution measure of the products as well as by the account distribution measure to identify products having a market distribution measure equal to or below the minimum market distribution measure. These products are screened from being considered as candidates for addition to the account's inventory.

In a preferred embodiment, the processor generates a report list of the addition recommendations which is output to the output device 21. Most preferably, the processor generates a report list of the addition recommendations which is output to a printer for printing.

In one embodiment of the invention, each product included in the associated market and account data is given a ranking value which expresses a projected volume for its product in the account. The projected volume may be used to determine whether to add a product which is determined to be a candidate for addition to the account's inventory.

The ranking value is determined from a market sort measure, the market distribution measure, and an account market share measure. A market sort measure for each product in the market may be included in the market data, where the market sort measure may be any measure of product performance, and, in a preferred embodiment, is the market level sales volume of the product with which the market sort measure is associated. The market distribution measure is described above. An account market share measure may be determined from input received from an input device, such as a keyboard, or from the account data. The account market share measure provides the account's share of the market, preferably in terms of the percent of the market held by the account.

The ranking value expresses a product's projected volume in the account by determining the market volume performance of a product for one percent of the market, and multiplying that by the percentage of the market held by the account. The processor calculates the ranking value by calculating the ratio of the market sort measure to the market distribution measure and multiplying the ratio by the account market share measure. In a preferred embodiment the ranking value is a projected dollar sales volume which is obtained by dividing a market sort measure, which is a dollar sales volume, by the market distribution measure, and multiplying by the account market share measure.

In a preferred embodiment, the addition recommendations are used to generate recommendations for swapping products stocked by an account for products not stocked by the account. The processor generates swapping candidates by identifying products in the account inventory for which the addition candidate products are considered substitutes, and pairing the identified products and their substitutable addition candidate products. The processor has means for associating the product attribute data, preferably located on a second memory device separate from the memory device having the market and account data thereon, and the account data to correlate a product identifier with each product of the plurality of account products. As described above, the product identifier classifies its respective product according to customer perceived substitutability of the product with other products included in the product attribute database or by the similarity of the product with other products in the product attribute database.

The processor also has means for associating the product attribute data and the associated market and account data to correlate a product identifier with each product that has been determined to be a candidate for addition to the account's inventory. The product identifiers may be used to identify candidates for swapping by matching the product identifiers of the candidates for addition with similar product identifiers of the products included in the account data. The processor has means for automatically pairing products having matching product identifiers, where one of the products is a candidate for addition and one of the products is an account product included in the account data.

In a preferred embodiment, the processor determines ranking values as described above for the products that are candidates for addition, and for the products included in the account data. The processor compares each pair of products that are determined to be candidates for swapping by the ranking value of each respective product to determine if a swapping recommendation should be made. A swapping recommendation is made if the product that is a candidate for addition has a better ranking value than the product in the account's inventory.

The deletion, addition, and swapping recommendations are implemented in the processor according to the method shown in FIGS. 4A–12B. In FIGS. 4A–12B, flow charts are shown. In the flow charts, the following graphical conventions are observed: a rectangle for either a process, function, or screen display, and a diamond for a decision. These conventions are well understood by programmers skilled in the art and the flow charts are sufficient to enable a programmer skilled in the art to write code in any suitable computer programming language for a processor which supports the selected language.

Figure 4A:
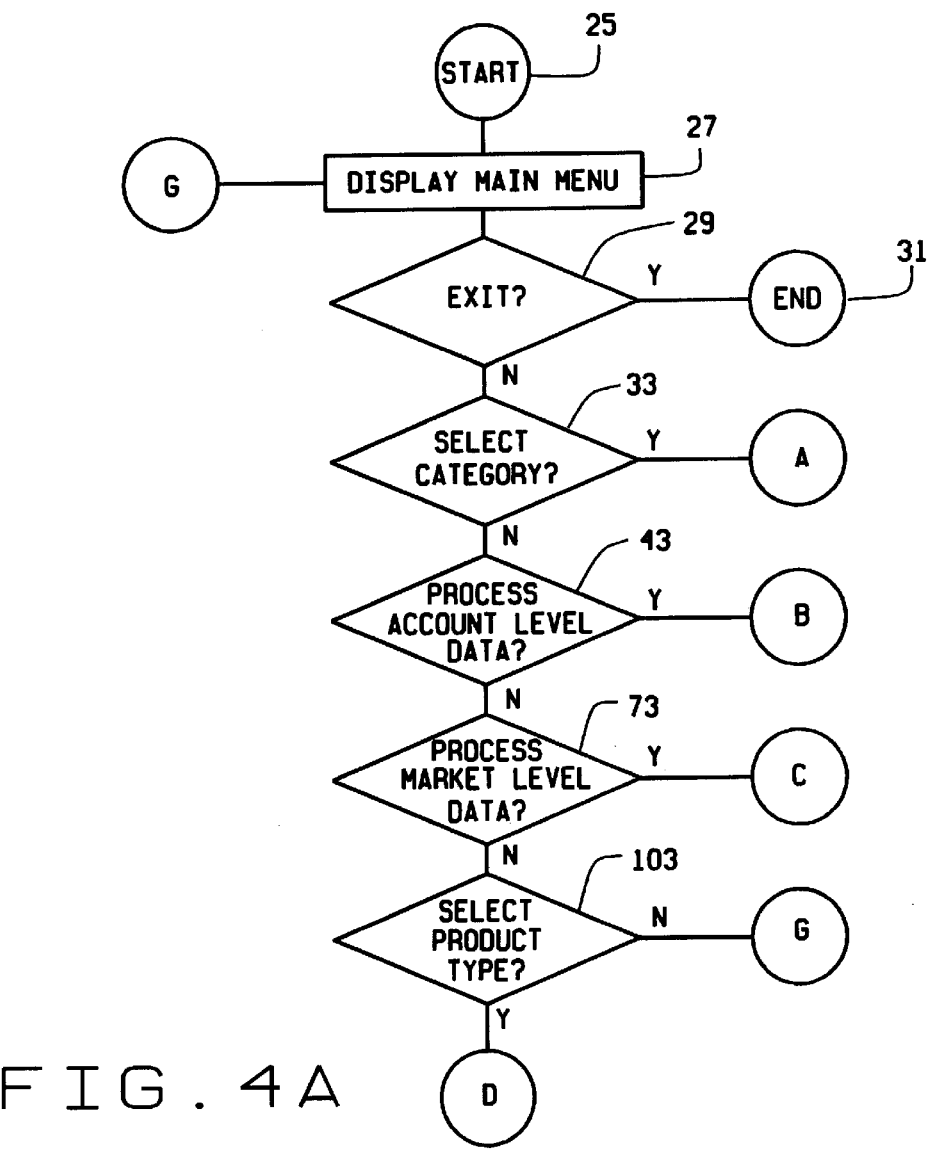
FIGS. 4A–4C are flow charts of operations performed by the system hardware of the present invention for directing the operation of the product rationalization system.

Referring now to FIG. 4A, the recommendation process is started in step 25. The processor displays a main menu on a user interface, step 27. The main menu provides several options which a user may select in recommendation processing, including exiting the recommendation processing, selecting a product category, reading in account data, reading in market data, and selecting a product type within a product category for recommendation processing. The processor determines if an exit command was selected from the main menu, step 29. If YES, then the recommendation process is terminated, step 31. If NO, then the processor determines if a category of products (i.e. cat food, dog food) is to be selected for recommendation processing, step 33.

Figure 5:
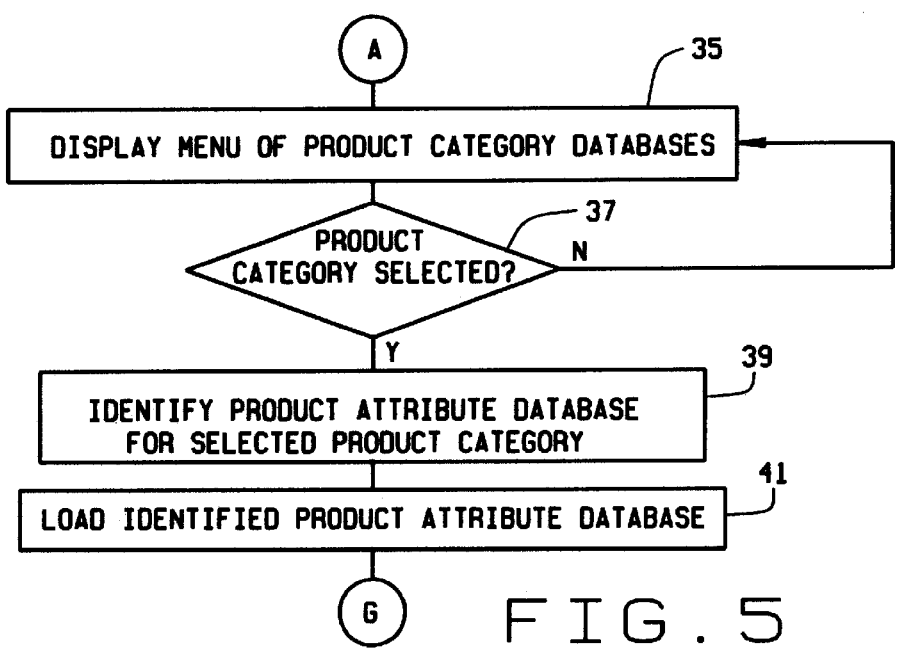
FIG. 5 is a flow chart of operations performed by the system hardware of the present invention in selecting a product category.

Referring now to FIG. 5, if the result of step 33 is YES, a category of products is to be selected, then the processor displays a menu of category databases, step 35. The category databases listed in the menu are product attribute databases for specified categories of products. The processor determines if a product category has been selected from the menu of category databases, step 37. If NO, then the processor returns to step 35 and displays the menu of product category databases. If YES, then the processor identifies the product attribute database for the selected category of products, step 39, and loads the selected product attribute database, step 41. Referring back to FIG. 4A, the processor then returns to display the main menu, step 27.

Figure 6A:
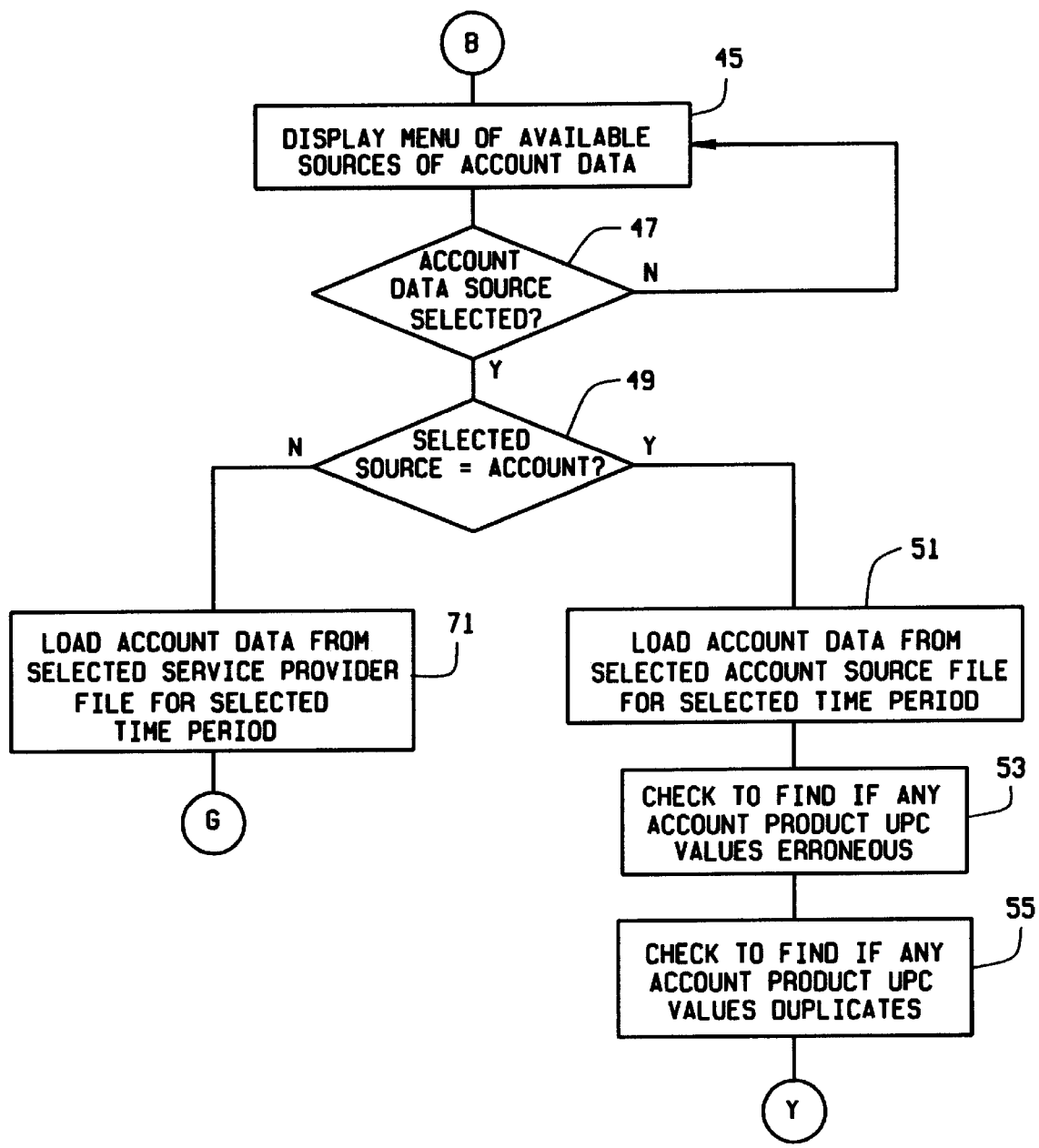
FIGS. 6A–6B are flow charts of operations performed by the system hardware of the present invention in selecting an account performance data source.
Figure 6B:
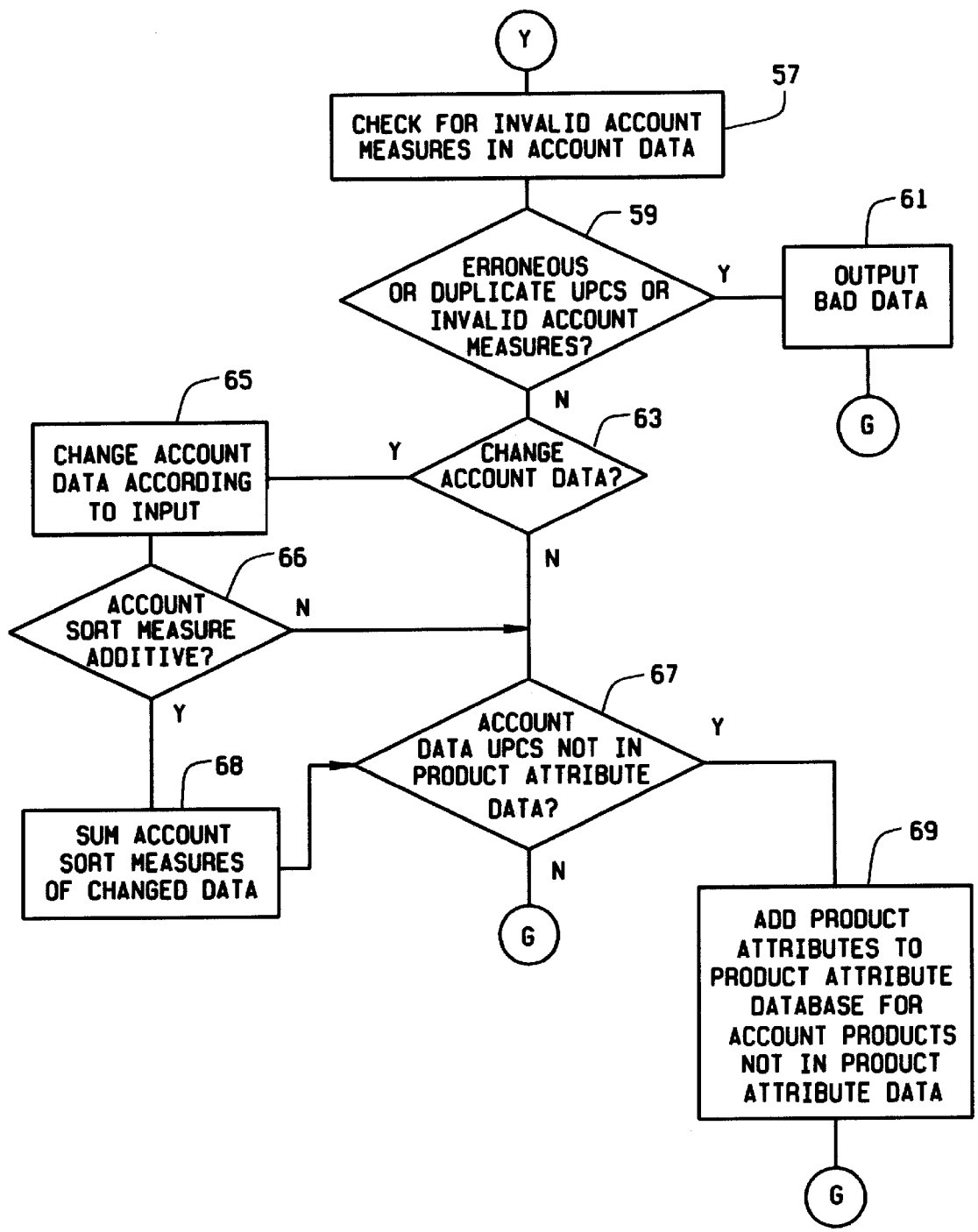

If the result of step 33 is NO, a category of products is not to be selected, then the processor determines if account data is to be processed, step 43. If YES, then the processor displays a menu of available sources of account data, step 45, as shown in FIG. 6A. Typically the available sources of account data will be account files from the account, and account files from one or more data service providers, such as IRI. The processor determines if an account data source has been selected from the menu, step 47. If NO, then the processor displays the menu of available sources of account data, step 45. If YES, then the processor determines if the selected source is from the account, step 49.

If the result of step 49 is YES, the selected account data source is from the account, the processor loads account data from a selected account source file for a selected time period, step 51. The selected account source file and selected time period are determined from input to the processor. The processor then checks to find if any account product UPC values are erroneous, step 53, if any UPC values are duplicates, step 55, and, referring to FIG. 6B, if any account sort measures are invalid, step 57, in the account data. The processor determines if any erroneous or duplicate UPCs or invalid account sort measures have been found in the account data, step 59. If YES, then the processor outputs the bad data, step 61, and returns to display the main menu, step 27.

If NO, the processor determines if the account data is to be changed, step 63. The account data may be changed to combine data relating to a single product that is offered in more than one form, where the form is not a distinguishing form for recommendation purposes and each separate form has an individual UPC code. For example, account data relating to a product sold as an individual offering and sold with bonus packs may be combined to more accurately reflect the value of the product. If the result of step 63 is NO, then the processor proceeds to step 67, described below.

If the result of step 63 is YES, then the processor changes the account data according to user input, step 65. The processor then determines whether the account sort measures of related product offerings in the changed account data are additive, step 66. Additive account measures may be summed for all related product offerings to accurately reflect a total account sort measure. For example, a dollar sales volume for each product offering may be summed over all the product offerings to provide a total dollar sales volume for the product. Non-additive account sort measures may be a ratio of specific measures used to provide a weighted average sort measure. If the result of step 66 is YES, the account sort measures are additive, then the processor sums the account sort measures for all related product offerings, step 68. The processor then proceeds to step 67, as described below. If the result of step 66 is NO, the account sort measures are not additive, the processor proceeds to step 67 below.

The processor determines if the account data includes account products having UPC codes that are not included in a loaded product attribute database, step 67. If the result of step 67 is YES, the processor adds product attributes to the product attribute database for the account products not in the product attribute database according to user input providing the appropriate product attributes, step 69. The processor then returns to the main menu, step 27. If the result of step 67 is NO, then the processor returns to display the main menu, step 27.

Referring back to FIG. 6A, if the result of step 49 is NO, the selected account data source is not from the account, the processor loads account data from a selected service provider file for a selected time period, step 71. The selected service provider file and selected time period are determined from user input to the processor. The processor then returns to display the main menu, step 27.

Figure 7A:
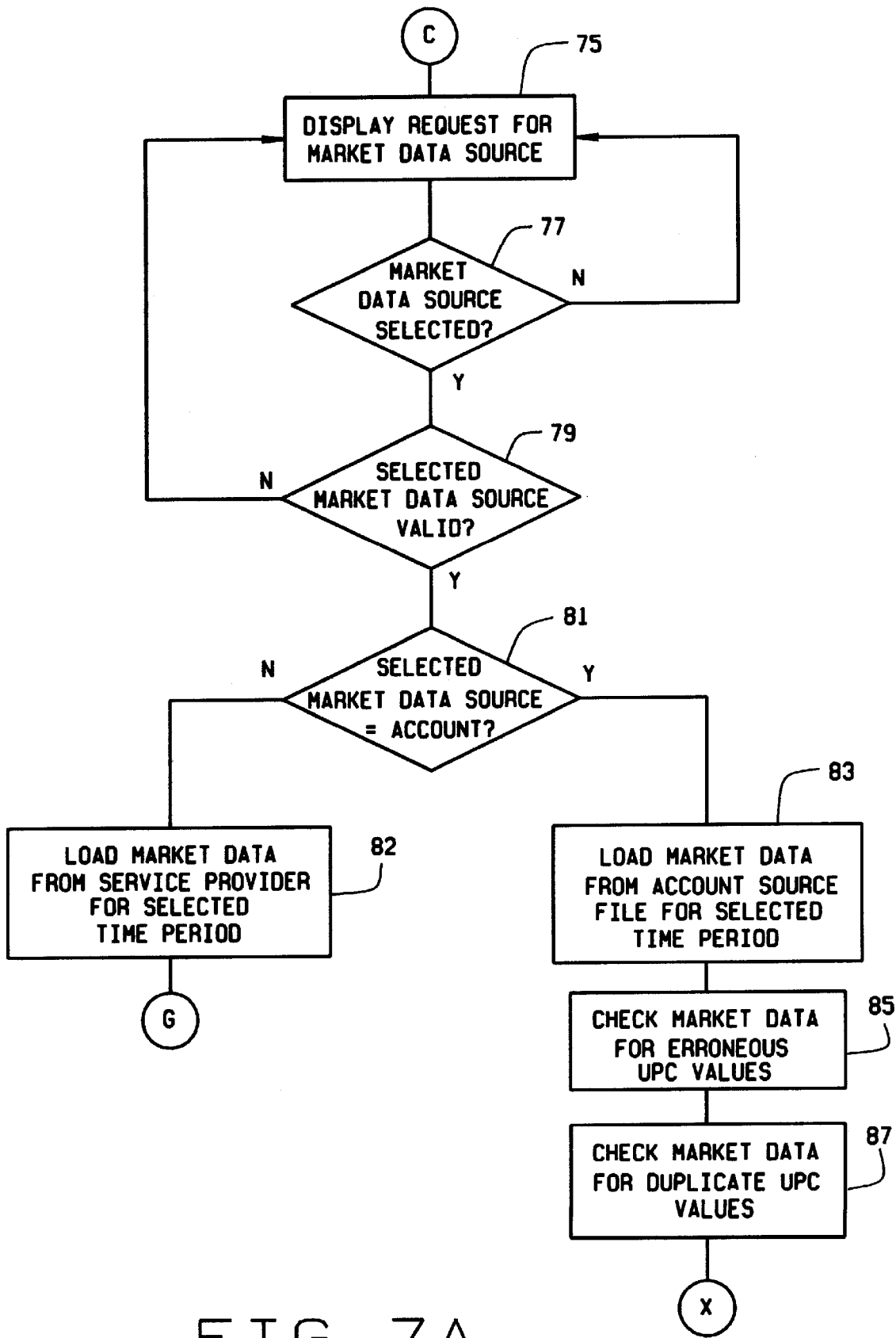
FIGS. 7A–7B are flow charts of operations performed by the system hardware of the present invention in selecting a market performance data source.
Figure 7B:
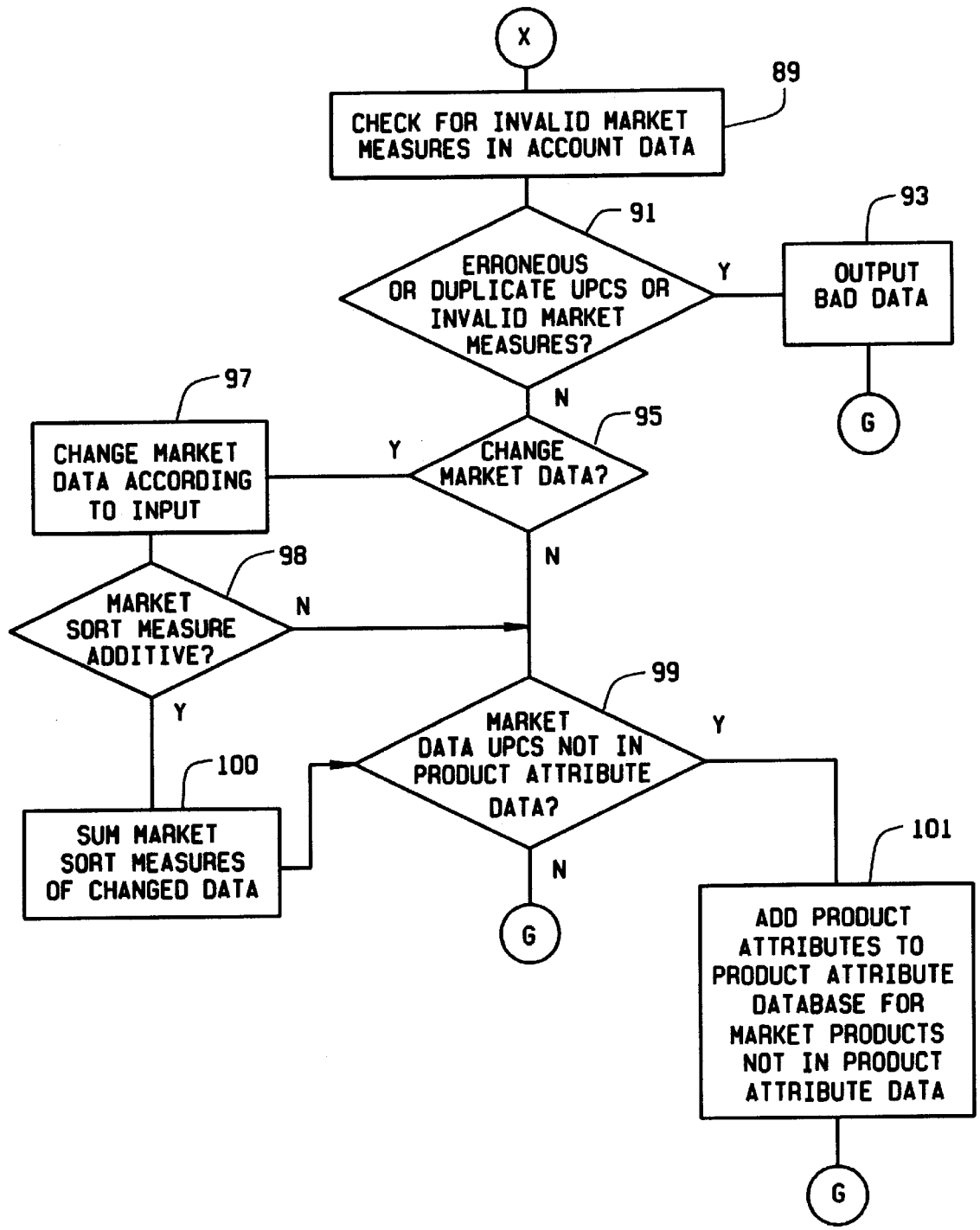

Referring again to FIG. 4A, if the result of step 43 is NO, account data is not to be processed, then the processor determines if market data is to be processed, step 73. If YES, then the processor displays a request for a data path and data file name to access a market data source, step 75, as shown in FIG. 7A. The processor then determines if a market data source has been selected, step 77. If NO, then the processor displays the request for a data path and data file name for a market data source, step 75. If YES, a market data source has been selected, then the processor determines if the selected data source is valid, step 79. If NO, then the processor again displays the request for a data path and data file name for market data, step 75. If YES, the selected data source is valid, the processor determines if the selected source is from the account, step 81.

If the result of step 81 is YES, the selected market data source is from the account, the processor loads market data from a selected account source file for a selected time period, step 83. The selected account source file and the selected time period are determined from input provided by a user. The processor then checks to find if any market product UPC values are erroneous, step 85, if any UPC values are duplicates, step 87, and, referring to FIG. 7B, if any market data values, such as the market sort measure and the market distribution measure, are invalid, step 89. The processor then determines if any erroneous or duplicate UPC values or invalid market data values have been found, step 91. If YES, then the processor outputs the bad data, step 93 and returns to the main menu, step 27.

If the result of step 91 is NO, the market data does not contain any invalid values, erroneous or duplicate UPCs, then the processor determines whether any market data is to be changed, step 95. If NO, then the processor proceeds to step 99, described below. If YES, the processor changes the market data according to input from a user, step 97. The processor then determines if the market sort measures of related product offerings in the changed market data are additive, step 98. If YES, then the processor sums the market sort measures for all related product offerings, step 100. The processor then proceeds to step 99, described below. If the result of step 98 is NO, the market sort measures are not additive, then the processor proceeds to step 99 below.

The processor determines if the market data contains products with UPCs that are not in a loaded product attribute database, step 99. If YES, the processor adds product attributes to the product attribute database for market products not in the product attribute database according to input from a user, step 101. The processor then returns to display the main menu, step 27. If the result of step 99 is NO, the market data does not contain products with UPCs that are not in a loaded product attribute database, then the processor returns to display the main menu, step 27.

Referring back to FIG. 7A, if the result of step 81 is NO, the selected source is not from the account, the processor loads market data from a selected service provider for a selected time period, step 82. The selected service provider is determined from the entered data path and data file name, and the selected time period is determined from user input. The processor then returns to display the main menu, step 27.

Figure 4B:
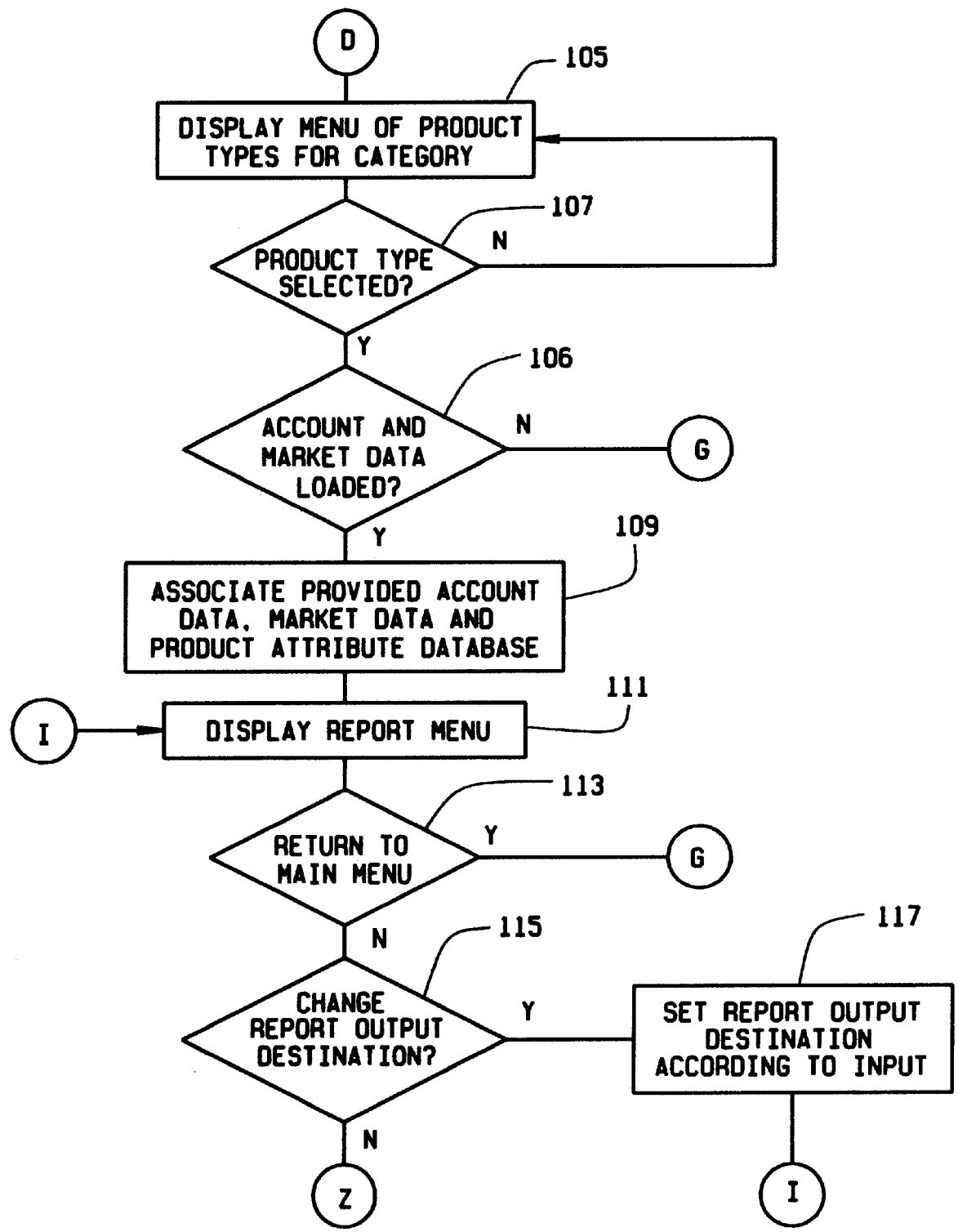

Referring again to FIG. 4A, if the result of step 73 is NO, no market data is to be processed, then the processor determines if a product type is to be selected from a product category for recommendation processing, step 103. If NO, then the processor returns to display the main menu, step 27. If YES, a product type is to be selected from a product category for recommendation processing, then the processor displays a menu of product types within the product category, step 105, as shown in FIG. 4B. For example, as shown in FIG. 2, types (or forms) of products within the product category of dog food could be canned dog food, dry dog food, moist dog food, and dog treats.

Referring again to FIG. 4B, the processor determines if a product type has been selected from the product type menu, step 107. If NO, then the processor displays the product type menu, step 105. If YES, a product type has been selected, then the processor determines whether both account data and market data have been loaded for the product category, step 106. If NO, then the processor returns to the main menu, step 27, so the data can be loaded. If YES, the processor associates provided account data, market data, and a product attribute database of the selected product type's product category, preferably by the UPCs of products within the respective data, step 109.

The processor then displays a report menu, step 111. The report menu provides a selection of product screening actions, recommendation reports and product lists that the processor may generate, including deletion recommendation reports, addition recommendation reports, product screening, and a master UPC list report.

The processor determines whether a selection has been made in the report menu to return to the main menu, step 113. If YES, then the processor returns to the main menu, step 27. If the result of step 113 is NO, no selection has been made to return to the main menu, then the processor determines whether a selection has been made in the report menu to change the report output destination, step 115. If YES, then the processor changes the report output destination according to user input, step 117, and returns to the report menu, step 111.

Figure 4C:
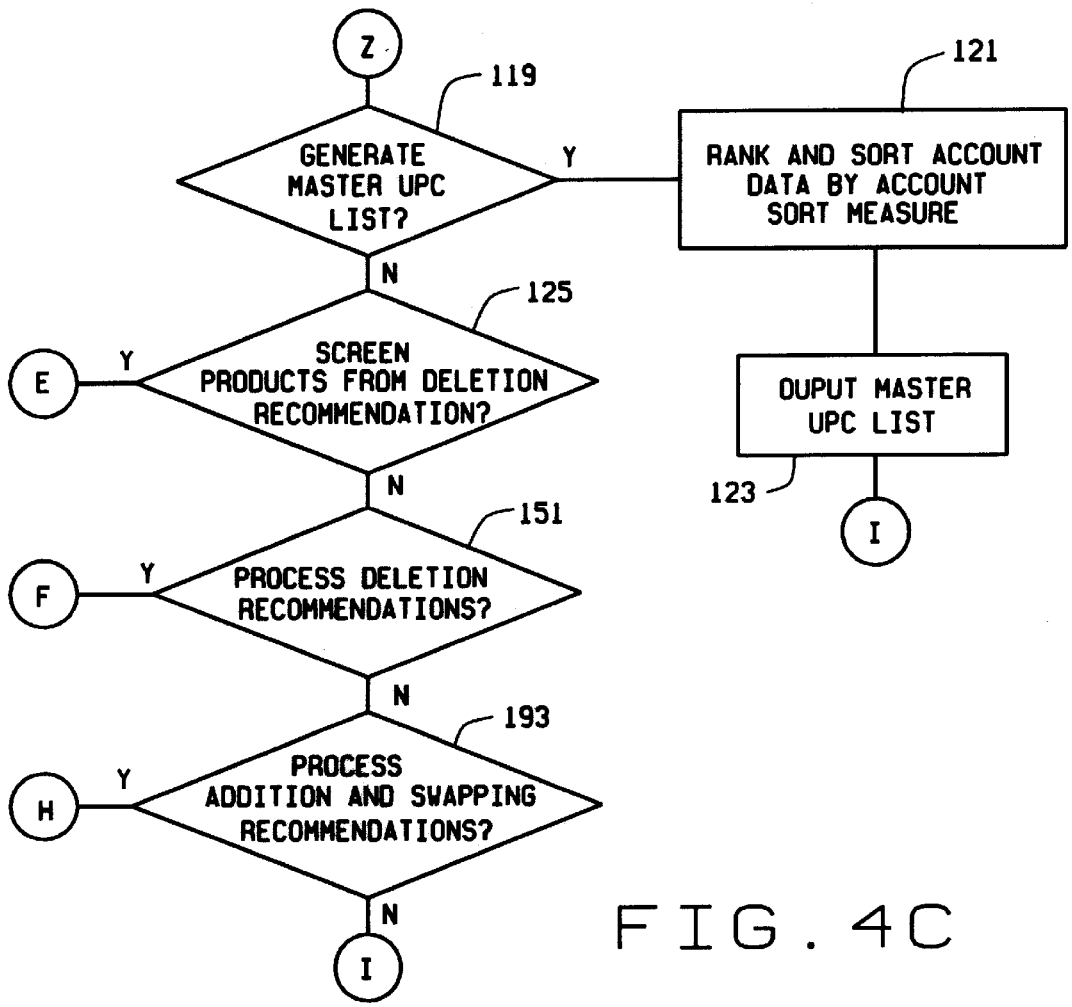

As shown in FIG. 4C, if the result of step 115 is NO, then the processor determines whether a selection has been made in the report menu to generate a master UPC list, step 119. If YES, the processor ranks and sorts loaded account data by the account sort measure of each product in the account data, step 121. The processor then generates and outputs a master UPC list of the products in the product attribute data to the selected output destination, step 123, and returns to the report menu, step 111.

Figure 8:
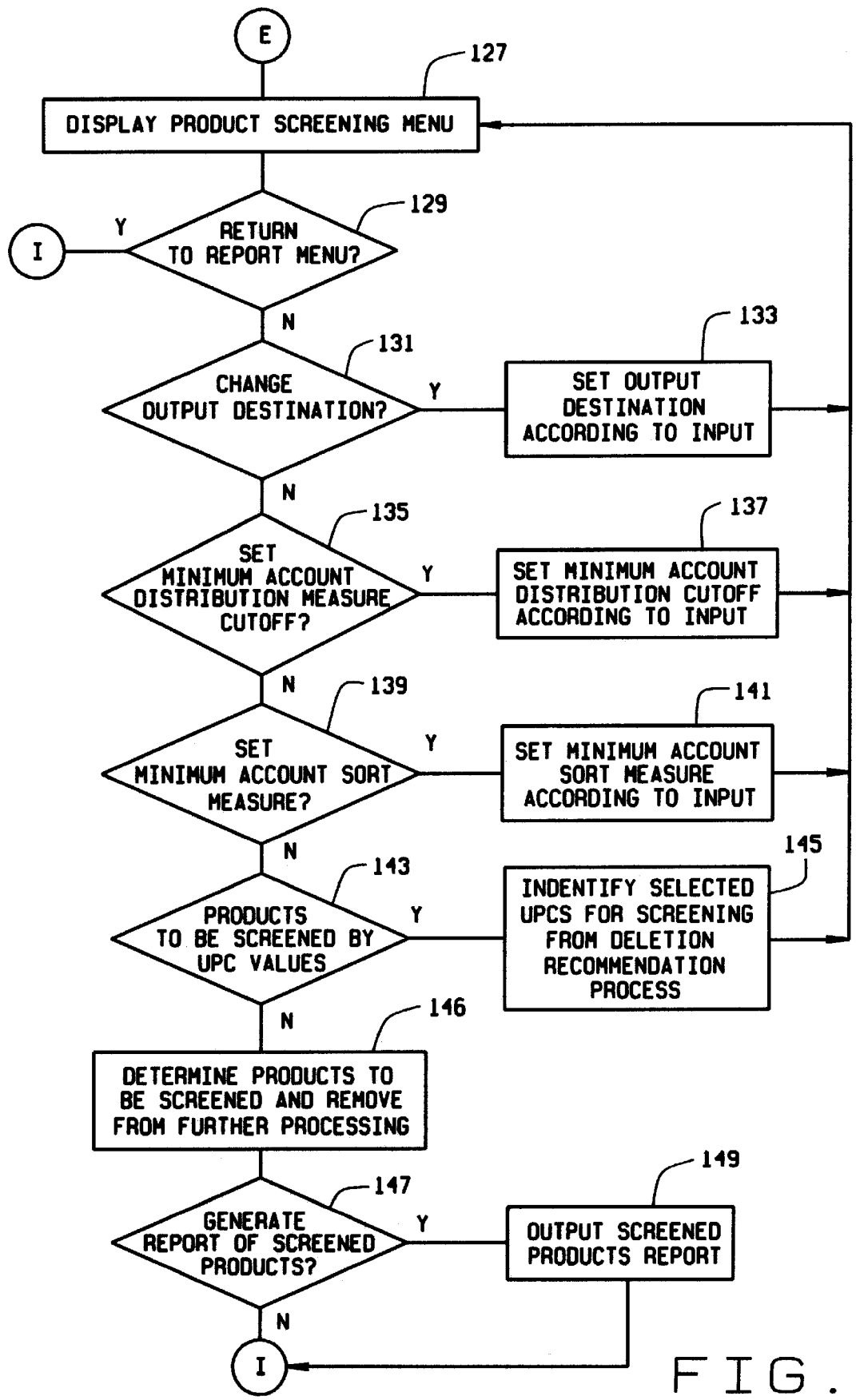
FIG. 8 is a flow chart of operations performed by the system hardware of the present invention in screening various products from deletion recommendation analysis.

If the result of step 119 is NO, no master UPC list is to be generated, the processor determines whether a selection has been made in the report menu to screen products from a deletion recommendation process, step 125. If YES, the processor displays a product screening menu, step 127, as shown in FIG. 8. The processor then determines whether a selection has been made in the product screening menu to return to the report menu, step 129. If YES, then the processor displays the report menu, step 111. If the result of step 129 is NO, the processor determines if a selection has been made in the product screening menu to change the output destination, step 131. If YES, then the processor sets the output destination according to user input, step 133, and then displays the product screening menu, step 127.

If the result of step 131 is NO, the output destination is not to be changed, then the processor determines if a selection has been made in the product screening menu to set a minimum account distribution measure for screening products having a account distribution measure below the minimum account distribution measure from being recommended for deletion, step 135. If YES, the processor sets the minimum account distribution measure according to user input, step 137. The processor then displays the product screening menu, step 127.

If the result of step 135 is NO, then the processor determines if a selection has been made in the product screening menu to set a minimum account sort measure for screening products having an account sort measure below the minimum account sort measure from being recommended for deletion, step 139. If YES, the processor sets the minimum account sort measure according to user input, step 141. The processor then displays the product screening menu, step 127.

If the result of step 139 is NO, then the processor determines if a selection has been made in the product screening menu to select individual or groups of products for screening according to their UPC values, step 143. If YES, then the processor identifies products having selected UPC values for screening from the deletion recommendation process, where the selected UPC values are determined from user input, step 145. The processor then displays the product screening menu, step 127.

If the result of step 143 is NO, then the processor determines which products are to be screened from the deletion recommendation process, and removes the screened products from further processing, step 146. The processor determines which products are to be screened by selecting products having: an account distribution measure equal to or below the set minimum account distribution cutoff; or an account sort measure equal to or below the set minimum account sort measure; or selected UPC values set to be screened.

The processor then determines if a selection has been made in the product screening menu to generate a report of screened products, step 147. If YES, then the processor outputs a report of products that are screened from being recommended for deletion to an output device, step 149. The processor then displays the report menu, step 111. If the result of step 147 is NO, no report of screened products is to be generated, the processor then displays the report menu, step 111.

Figure 9:
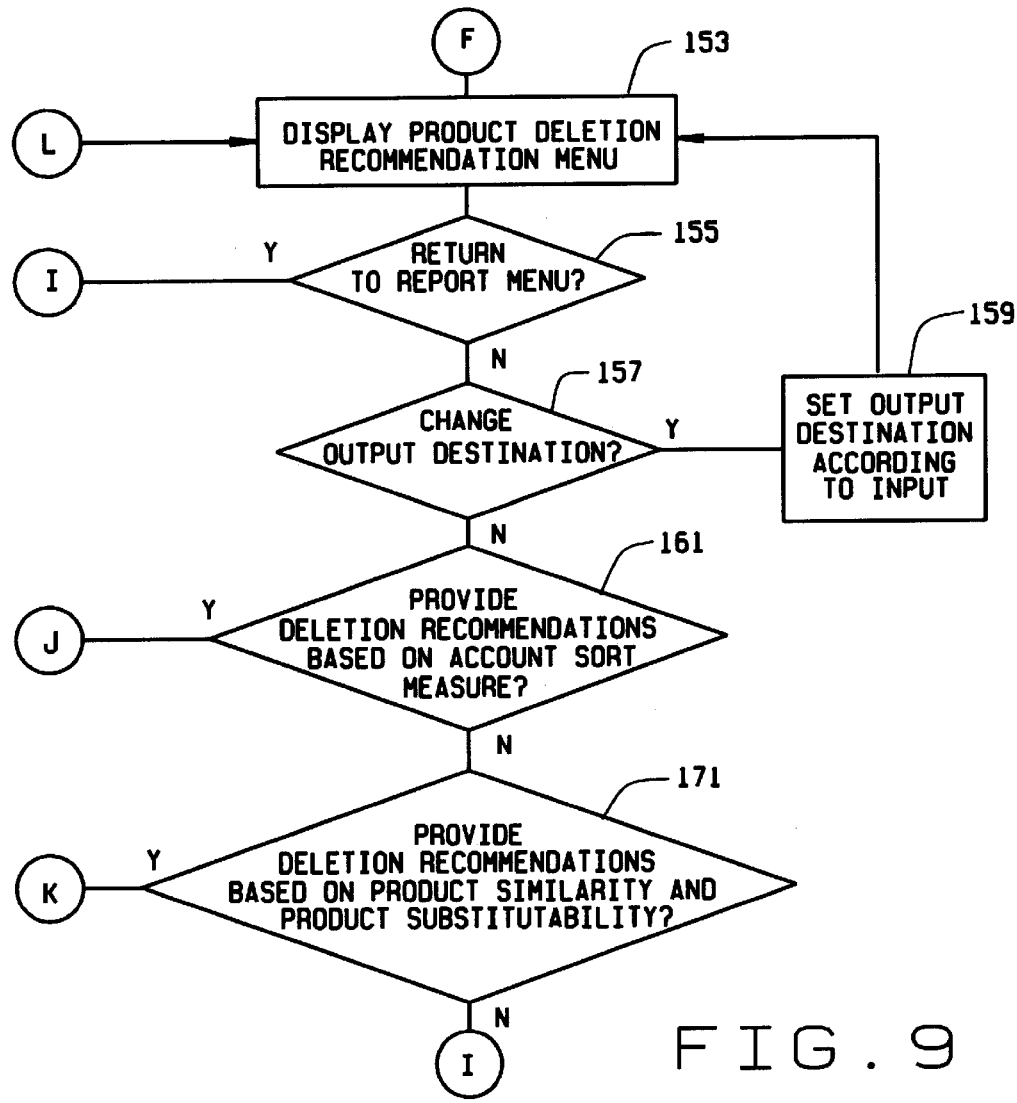
FIG. 9 is a flow chart of operations performed by the system hardware of the present invention in identifying product deletion recommendations.

Referring back to FIG. 4C, if the result of step 125 is NO, no selection has been made in the report menu to screen products from the deletion recommendation process, then the processor determines if a selection has been made in the report menu to process deletion recommendations, step 151. If YES, a selection has been made to process deletion recommendations, the processor displays a product deletion recommendation menu, step 153, as shown in FIG. 9. The product deletion recommendation menu includes selections to return to the report menu, to change the output destination, to provide deletion recommendations based solely on the account sort measure of products in the account data, and to provide deletion recommendations based on the similarity of product characteristics and on the substitutability of products in the associated account data and product attribute data.

The processor determines if a selection has been made in the product deletion recommendation menu to return to the report menu, step 155. If YES, then the processor displays the report menu, step 111. If NO, then the processor determines if a selection has been made in the product deletion recommendation menu to change the output destination, step 157. If YES, then the processor sets the output destination according to user input, step 159, and then displays the product deletion recommendation menu, step 153.

Figure 10:
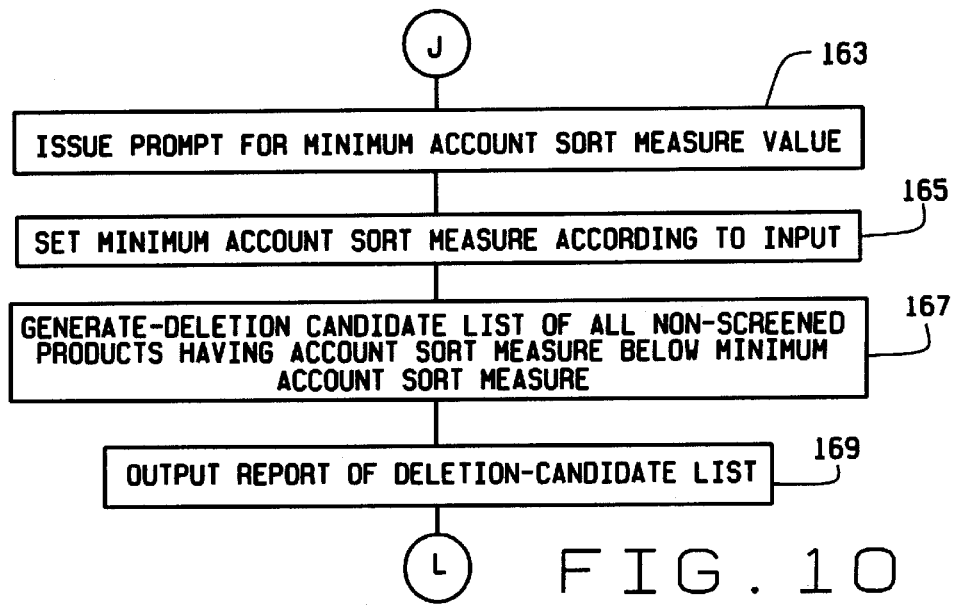
FIG. 10 is a flow chart of operations performed by the system hardware of the present invention in identifying product deletion recommendations according to an account sort measure.

If NO, the output destination is not to be changed, the processor determines whether a selection has been made in the product deletion recommendation menu to provide deletion recommendations based solely on the account sort measure of products in the account data, step 161. If YES, the processor displays a request for a minimum account sort measure value, step 163, as shown in FIG. 10. The minimum account sort measure value is input by a user for providing a cutoff for determining which products are to be selected as products to be recommended for deletion. The processor sets the minimum account sort measure value according to the input, step 165.

The processor then sorts the account data to generate a deletion candidate list of all non-screened products having an account sort measure equal to or below the minimum account sort measure, step 167. The processor outputs a report of the deletion candidate product list to an output device, step 169. Referring back to FIG. 9, the processor then returns to the product deletion recommendation menu, step 153.

If the result of step 161 is NO, deletion recommendations are not to be made based solely on the account sort measure of the products in the account data, then the processor determines if a selection has been made in the product deletion recommendation menu to provide deletion recommendations based on the similarity of product characteristics and the substitutability of products in the associated account data and product attribute data, step 171.

Figure 11A:
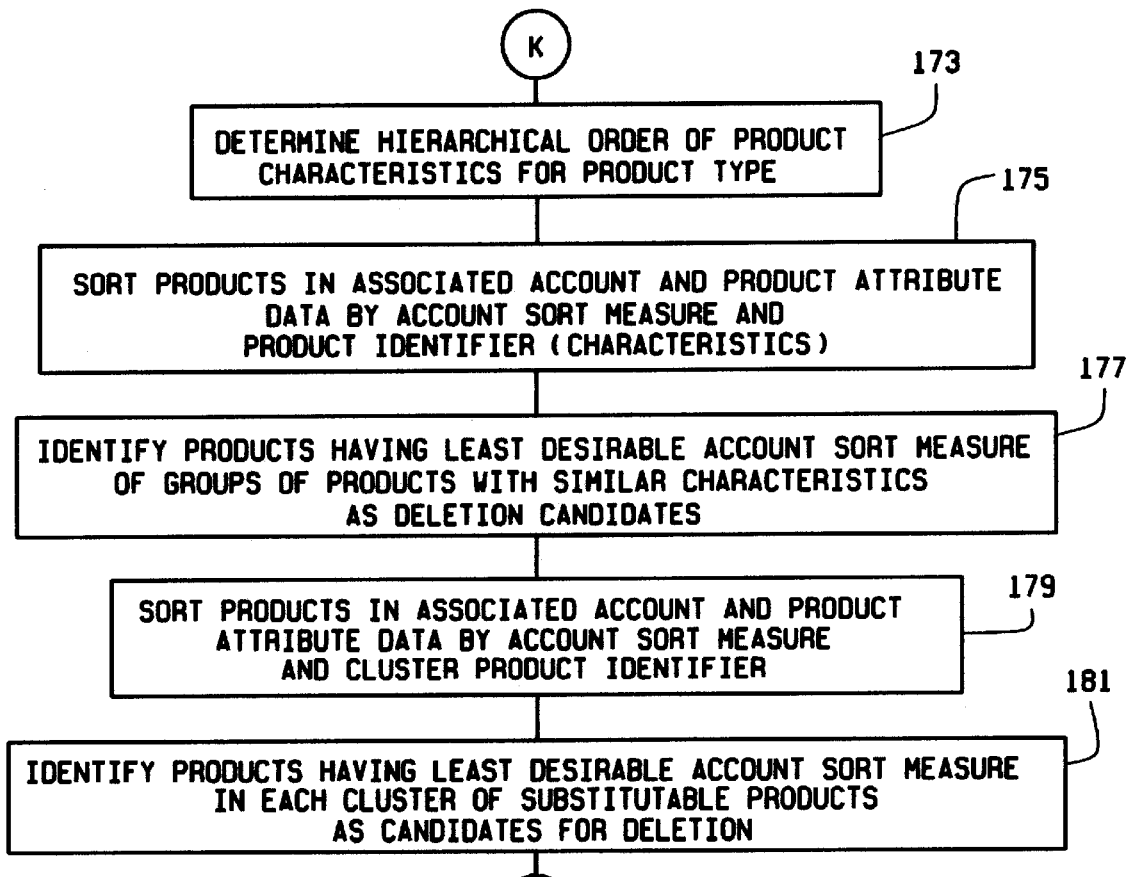
FIGS. 11A–11B are flow charts of operations performed by the system hardware of the present invention in identifying product deletion recommendations according to cluster ranking and hierarchical ranking.

Referring now to FIG. 11A, if the result of step 171 is YES, the processor determines the hierarchical order of product characteristics for the product type being processed from the product identifiers of the products in the associated account data and product attribute data, step 173, where the product attribute data includes product identifiers having hierarchically ranked product characteristics for the account products. For example, as shown in FIG. 2, if the product type is canned dog food, the processor will determine from the product identifiers that the product characteristics are hierarchically ranked, in order of importance, by class, size, brand, and flavor. The processor will then sort the products in the associated account and product attribute data by the account sort measure and by the product characteristics included in the product identifiers, step 175, to group the products into groups of products having similar characteristics except for less important characteristics, where each group of similar products is ordered according to its account sort measure value. In a preferred embodiment, the processor will sort the products into groups having common product characteristics except for the least significant characteristic of the hierarchically ranked characteristics. In the above example, the canned dog food products would be sorted into groups having the same class, size, and brand, but having different flavors.

The processor then identifies products in the sorted data having the least desirable account sort measure of its respective group as candidates for deletion, step 177. In a preferred embodiment, the account sort measure is the dollar sales volume of the product in the account, and the products having the lowest dollar sales volume of their respective similar characteristic groups are selected as candidates for deletion.

The processor then sorts the products in the associated account and product attribute data by the cluster product identifiers of the products into groups of products that are considered substitutes for each other, and by the account sort measure of the products to order the products within the groups of substitutable products according to their account sort measures, step 179. In a preferred embodiment, the cluster product identifiers are numbers which identify substitutable products.

The processor then identifies the products having the least desirable account sort measure in each cluster of substitutable products as candidates for deletion, step 181. In a preferred embodiment, the account sort measure is the dollar sales volume of a product in the account, and the product having the lowest dollar sales volume in a group of substitutable products is identified as a candidate for deletion.

Figure 11B:
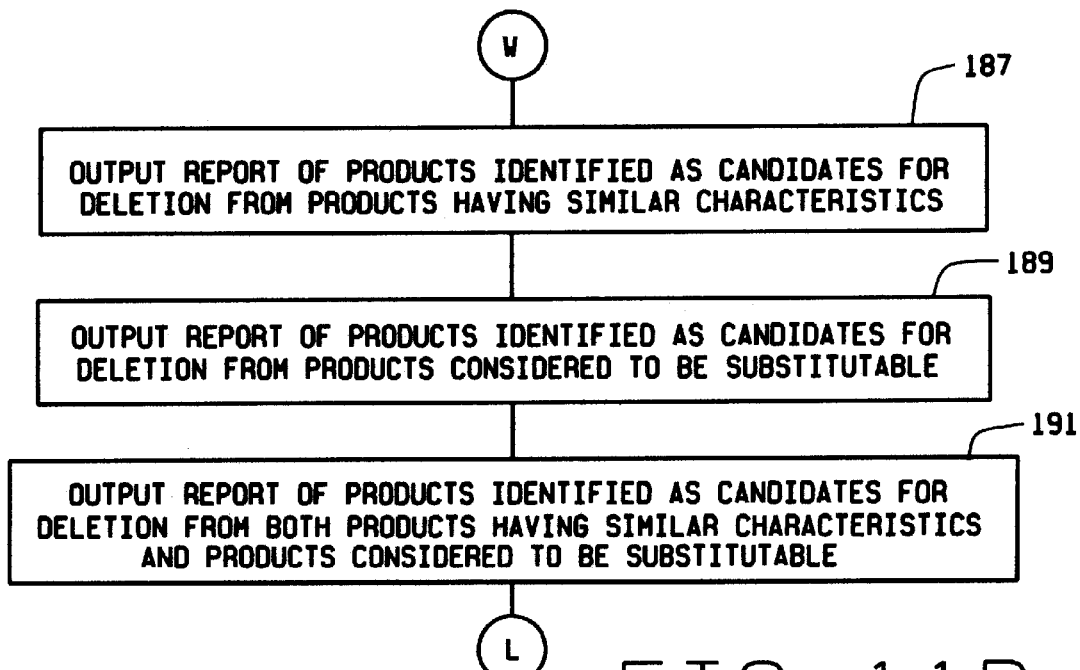

As shown in FIG. 11B, the processor then outputs a report of the products that were identified as candidates for deletion from the products having similar characteristics, step 187. The processor also outputs a report of the products that were identified as candidates for deletion from the products considered to be substitutable, step 189. The processor then outputs a report of products that were identified as candidates for deletion from both the products having similar characteristics and the products considered to be substitutable, step 191. Referring again to FIG. 9, the processor then displays the product deletion recommendation menu, step 153.

If the result of step 171 is NO, deletion recommendations are not to be provided based upon product similarity and product substitutability, then the processor displays the report menu, step 111.

Figure 12A:
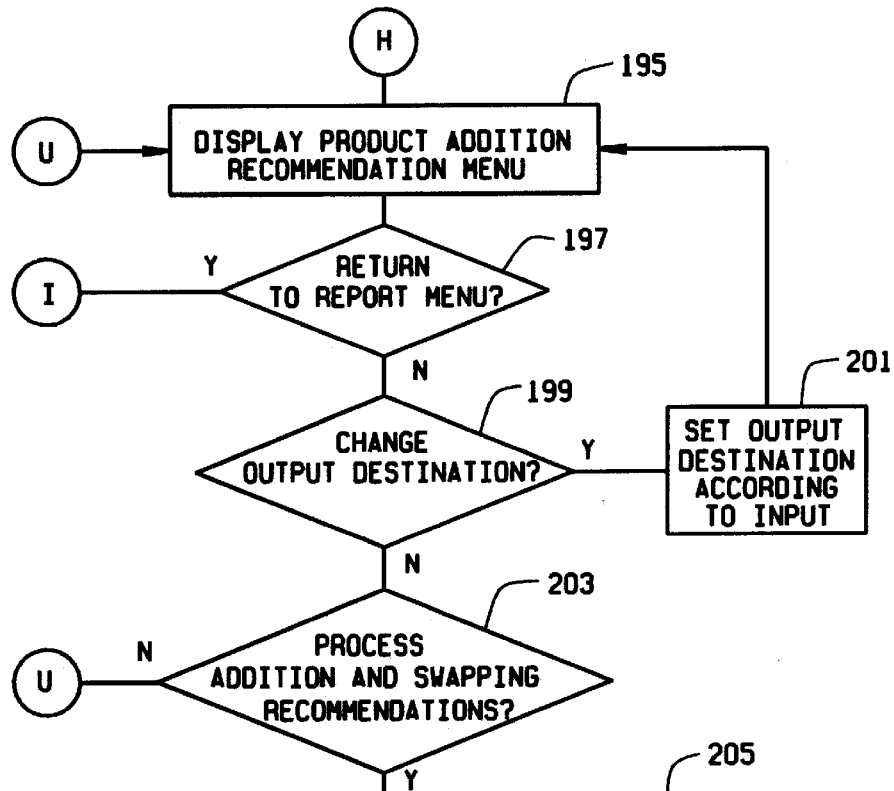
FIGS. 12A–12B are flow charts of operations performed by the system hardware of the present invention in identifying product addition and swapping recommendations.

Referring now to FIG. 4C, if the result of step 151 is NO, deletion recommendations are not to be processed, then the processor determines if a selection has been made in the report menu to process addition recommendations and swapping recommendations, step 193. If YES, then the processor displays the product addition recommendation menu, step 195, as shown in FIG. 12A. The product addition recommendation menu provides selections of returning to the report menu, changing the output destination, and generating addition and swapping recommendations.

The processor determines if a selection has been made in the product addition recommendation menu for returning to the report menu, step 197. If the result of step 197 is YES, the processor displays the report menu, step 111. If the result of step 197 is NO, then the processor determines if a selection has been made in the product addition recommendation menu for changing the output destination, step 199. If YES, then the processor changes the output destination according to user input, step 201, and then displays the product addition recommendation menu, step 195.

If the result of step 199 is NO, then the processor determines if a selection has been made in the product addition recommendation menu to process addition and swapping recommendations, step 203. If the result of step 203 is YES, then the processor sets a minimum market distribution measure, a minimum account distribution measure, and an account market share measure based on user input, step 205. The minimum account distribution measure determines a level of distribution of a product in an account at and below which a product is not considered to be included in the account's inventory. The minimum market distribution measure determines a level of distribution of a product in the market at and below which a product is not considered to be distributed in the market. The account market share measure determines the percentage of the market which is held by the account.

Figure 12B:
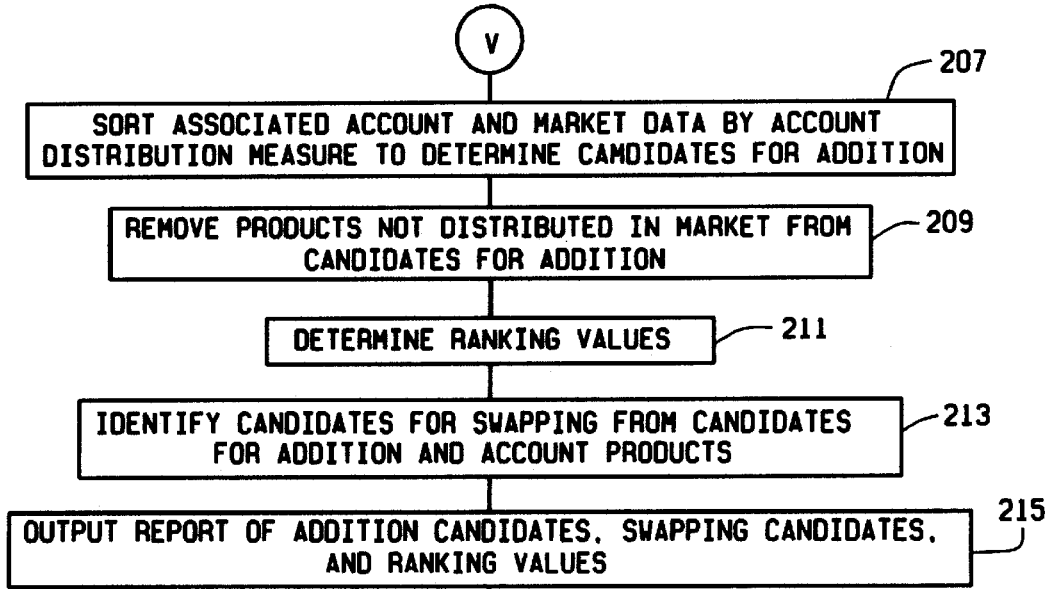

As shown in FIG. 12B, the processor then sorts the associated account and market data by the account distribution measure of the products in the associated data to determine candidates for addition to the account's inventory, step 207. The processor sorts the associated data to identify all products which have an account distribution measure equal to or below the minimum account distribution measure. The identified products are not considered to be in the account's inventory, and therefore are candidates for addition to the account's inventory. Products in the market data which are not in the account data have a zero-level account distribution measure, and are identified as candidates for addition when the processor sorts the associated data by the account distribution measure of the products.

After identifying the products that are candidates for addition, the processor may remove all products that are not considered to be distributed in the market from the identified candidates for addition, step 209. The processor sorts the associated account and market data by the market distribution measure of the products to identify products having a market distribution measure equal to or below the minimum market distribution measure. The identified products are not considered to be distributed by the market, and are removed from the list of products considered to be candidates for addition to the account's inventory.

The processor then determines a ranking value for the products in the associated account and market data which is used to project the future potential of a product in the account, step 211. The ranking value may be used to evaluate whether a candidate for addition should be added to the account's inventory, or whether a candidate for addition should be swapped for another product in the account's inventory. The processor calculates a ranking value for each product by dividing each product's market sort measure by its market distribution measure and multiplying the result by the account market share measure.

The processor then identifies candidates for swapping from the candidates for addition and from the products included in the account data, step 213. The processor determines product identifiers for the candidates for addition and for the account products from the associated product attribute data, account data, and market data, where the product identifiers are used to identify products that are considered substitutes for each other. The processor associates each product that is a candidate for addition with a cluster of account products for which the candidate for addition is considered a substitute by matching the product identifiers of the candidates for addition and the account products. The processor then compares the ranking values of each candidate for addition and the cluster of account products for which it may be substituted to determine if the candidate for addition has a higher ranking value than any of the cluster of account products. Candidates for addition that have a higher ranking value than an account product for which a candidate for addition may be substituted and the account product having a lower ranking value than its respective candidate for addition are identified as swapping candidates.

The processor then outputs a report of the products identified as candidates for addition, and the products identified as candidates for swapping to the output destination, step 215. In a preferred embodiment, the report includes the ranking value determined for each product that is a candidate for addition, and each product that is a candidate for swapping. The processor then displays the report menu, step 111, FIG. 4B.

Referring back to FIG. 12A, if the result of step 203 is NO, no selection has been made in the product addition recommendation menu to process addition and swapping recommendations, the processor displays the product addition recommendation menu, step 195.

Referring again to FIG. 4C, if the result of step 193 is NO, no selection has been made in the report menu to process addition and swapping recommendations, the processor displays the report menu, step 111, from which the main menu may be selected for the purpose of exiting the rationalization process.

The foregoing disclosure and showings made in the drawings are merely illustrative, and are not to be interpreted in a limiting sense.

What is claimed is:

1. A product rationalization system for automatically and objectively determining products sold by an account that are candidates for deletion from the account's inventory, comprising:

a memory having product attribute data for a plurality of market products stored thereon, said product attribute data including a product identifier for each product, each product identifier identifying a product group to which its respective product belongs; and a processor communicatively coupled to said memory, said processor having means for associating account data and said product attribute data where said account data includes an account sort measure and market data for each product of a plurality of account products, said processor further having means for automatically sorting said associated data for said plurality of account products by product identifier and by account sort measure to determine whether each product of said plurality of accounts products has an account distribution measure equal to or below a minimum account distribution measure to determine whether each product is a candidate for deletion from its respective product group, and therefore, a candidate for deletion from said account's inventory.

2. The product rationalization system as set forth in claim 1, further comprising report generating means communicatively coupled to said processor for generating a report list of products determined to be candidates for deletion from said account's inventory.

3. The product rationalization system of claim 1 wherein said product identifier of said product attribute data includes a first product identifier and a second product identifier for each product, said first product identifier identifying its respective product with a product group which consists of a cluster of products which are considered substitutes for each other, said second product identifier includes a set of product characteristics of its respective product hierarchically ranked according to characteristic significance, where each second product identifier identifies its respective product with a product group having a common set of product characteristics except for a least significant product characteristic.

4. The product rationalization system of claim 3 wherein said product characteristics of said second product identifier are hierarchically ranked according to consumer buying decision patterns.

5. The product rationalization system as set forth in claim 1, wherein each product identifier of said product attribute data identifies its respective product with a product group consisting of a cluster of products that are considered substitutes for each other.

6. The product rationalization system as set forth in claim 5, further comprising report generating means communicatively coupled to said processor for generating a report list of products determined to be candidates for deletion from said account's inventory.

7. The product rationalization system as set forth in claim 5 wherein said processor further includes means for screening each product identified by its product identifier as belonging to a product group consisting of only one product from being determined to be a candidate for deletion from said account's inventory.

8. The product rationalization system as set forth in claim 1 wherein each product identifier of said product attribute data includes a set of product characteristics of its respective product hierarchically ranked according to characteristic significance, where each product identifier identifies its respective product with a product group having a common set of product characteristics except for a least significant product characteristic.

9. The product rationalization system of claim 8 wherein said product characteristics of said product identifier are hierarchically ranked according to consumer buying decision patterns.

10. The product rationalization system as set forth in claim 8, further comprising report generating means communicatively coupled to said processor for generating a report list of products determined to be candidates for deletion from said account's inventory.

11. The product rationalization system as set forth in claim 8 wherein said processor further includes means for screening each product identified by its product identifier as belonging to a product group consisting of only one product from being determined to be a candidate for deletion from said account's inventory.

12. A product rationalization system for automatically and objectively determining products that are candidates for addition to an account's inventory, comprising:

a memory having market data for a plurality of market products stored thereon, said market data including a list of substantially all products available in a market, said market data further including a market distribution measure for each product of said plurality of products; and a processor communicatively coupled to said memory, said processor having means for associating said market data with account data, said account data including a list of substantially all products in said account, said associated data including an account distribution measure for each product of said plurality of market products in said account, said processor further having means for automatically sorting said associated data to determine products having an account distribution measure equal to or below a minimum account distribution measure to determine products that are candidates for addition to said account's inventory, said processor further including means for screening each product having a market distribution measure below a minimum market distribution measure from being determined as a candidate for addition to said account's inventory.

13. The product rationalization system as set forth in claim 12 further comprising report generating means communicatively coupled to said processor for generating a report list of products determined to be candidates for addition to said account's inventory.

14. The product rationalization system of claim 12, wherein said market data includes a market sort measure and a market distribution measure, said account data includes an account market share measure, and said processor further includes means for determining a ranking value for each product of said plurality of products from its respective market sort measure, market distribution measure and account market share measure.

15. The product rationalization system of claim 12, wherein:

said memory is a first memory;

product attribute data is stored on a second memory, said product attribute data including a product identifier for each product of said plurality of products, each product identifier identifying a product group to which its respective product belongs; and said processor is communicatively coupled with said second memory, said processor having means for associating said product attribute data and said account data to correlate each product in said account data having an account distribution measure greater than a minimum account distribution measure with a product identifier, said processor further having means for associating said product attribute data with said associated market and account data to correlate a product identifier with each product determined to be a candidate for addition to said account's inventory, said processor further having means for automatically pairing products having matching product identifiers from said products that are candidates for addition and said products in said account data having an account distribution measure greater than a minimum account distribution measure to identify products that are candidates for swapping in said account's inventory.

16. The product rationalization system as set forth in claim 15 further comprising report generating means communicatively coupled to said processor for generating a report list of products determined to be candidates for swapping.

17. The product rationalization system as set forth in claim 15, wherein each product identifier of said product attribute data identifies its respective product with a product group consisting of a cluster of products that are considered market substitutes for each other.

18. The product rationalization system as set forth in claim 15, wherein each product identifier of said product attribute data includes a set of product characteristics of its respective product hierarchically ranked according to characteristic significance, where each product identifier identifies its respective product with a product group having a common set of product characteristics except for a least significant product characteristic.

19. The product rationalization system of claim 15, wherein said market data includes a market sort measure and a market distribution measure, said account data includes an account market share measure, said processor further includes means for determining a ranking value for each product of said plurality of products from its respective market sort measure, market distribution measure, and account market share measure, and said processor further includes means for comparing each pair of products that are candidates for swapping by said ranking value of each respective product.

20. A method in a data processing system for determining products that are sold by an account that are candidates for deletion from the account's inventory, the data processing system including a processor and a memory storage device, the processor including a user interface and an input device, said method comprising:

providing product attribute data for a plurality of products stocked by said account, said product attribute data including a product identifier for each product, said product identifier identifying a product group to which its respective product belongs, said product group comprising of a cluster of products that are market substitutes for each other;

inputting account performance data and automatically associating said product attribute data with said account performance data, where said account performance data includes an account sort measure for each product of said plurality of products;

automatically sorting said associated data by said product identifier and by said account sort measure to determine whether each product of said plurality of products is a least desirable product in a product group; and recommending each product determined to be a least desirable product of a product group for deletion from said account's inventory.

21. A method in a data processing system as set forth in claim 20 wherein each product identifier of said product attribute data includes a set of product characteristics of its respective product hierarchically ranked according to characteristic significance, where each product identifier identifies its respective product with a product group having a common set of product characteristics except for a least significant product characteristic.

22. A method in a data processing system for determining products that are candidates for addition to an account's inventory, the data processing system including a processor and a memory storage device, the processor including a user interface and an input device, said method comprising:

inputting market data and account data for a plurality of products, said market data including a list of substantially all products available in a market, and said account data providing a list of substantially all products in an account;

associating said market data and said account data, said associated data including an account distribution measure for each product listed in said associated data;

automatically sorting said associated data to identify products having an account distribution measure equal to or below a minimum account distribution measure;

determining a ranking value for each product in said associated data from a market sort measure, market distribution measure, and an account market share measure of each product in said associated data; and recommending each product identified as a candidate for addition to said account's inventory.

23. The method of claim 22 further comprising:

providing product attribute data, where said product attribute data includes a product identifier for each product in said account data and said market data, each product identifier identifying a product group to which its respective product belongs;

associating said product attribute data with said account data to correlate each product in said account data having an account distribution measure greater than a minimum account distribution measure with a product identifier;

associating said product attribute data with each product identified as a candidate for addition to correlate each product as a candidate for addition with a product identifier;

identifying products that are candidates for swapping in said account's inventory from said products identified as candidates for addition and from products in said account data having an account distribution measure greater than a minimum account distribution measure by pairing products having matching product identifiers from said products that are candidates for addition and said products in said account data having an account distribution measure greater than a minimum account distribution measure; and recommending products identified as candidates for swapping products to be swapped in said account's inventory.

24. The method of claim 23 further comprising:

determining a ranking value for each product in said associated data from a market sort measure, market distribution measure, and a account market share measure of each product in said associated data; and comparing each pair of products identified as candidates for swapping in the account's inventory by their respective ranking values.

25. The method of claim 23 wherein each product identifier of said product attribute data identifies its respective product with a product group consisting of a cluster of products that are considered substitutes for each other.

26. The method of claim 23 wherein each product identifier of said product attribute data includes a set of product characteristics of its respective product hierarchically ranked according to characteristic significance, where each product identifier identifies its respective product with a product group having a common set of product characteristics except for a least significant product characteristic.

* * * * *